March 6, 1962 B. V. STILLER 3,023,851
ELECTRONIC MARKETING SYSTEM AND APPARATUS
Original Filed May 31, 1952 7 Sheets-Sheet 1

INVENTOR.
Bruno V. Stiller
BY
Kent W. Wonnell
Atty.

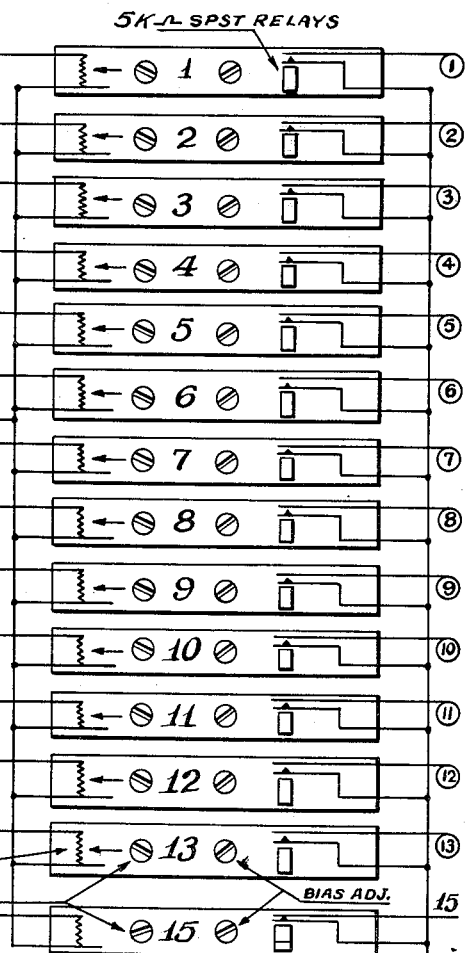
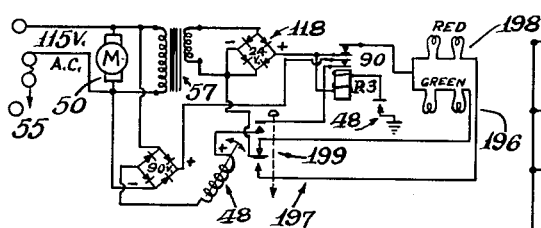
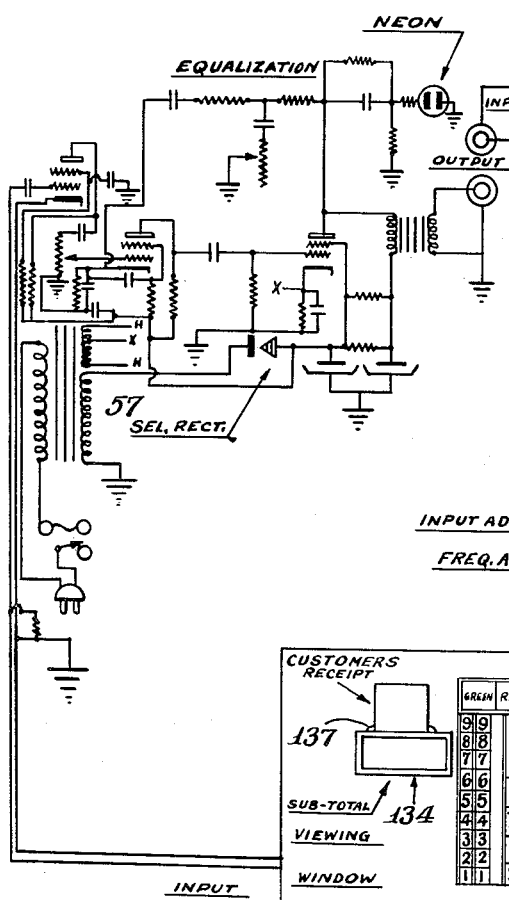
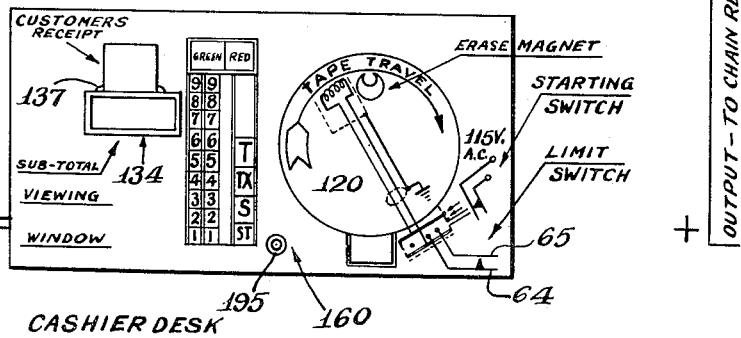

March 6, 1962  B. V. STILLER  3,023,851
ELECTRONIC MARKETING SYSTEM AND APPARATUS
Original Filed May 31, 1952  7 Sheets-Sheet 4

INVENTOR:
Bruno V. Stiller
BY
Kent M. Womwell
Atty.

March 6, 1962 B. V. STILLER 3,023,851
ELECTRONIC MARKETING SYSTEM AND APPARATUS
Original Filed May 31, 1952 7 Sheets-Sheet 5
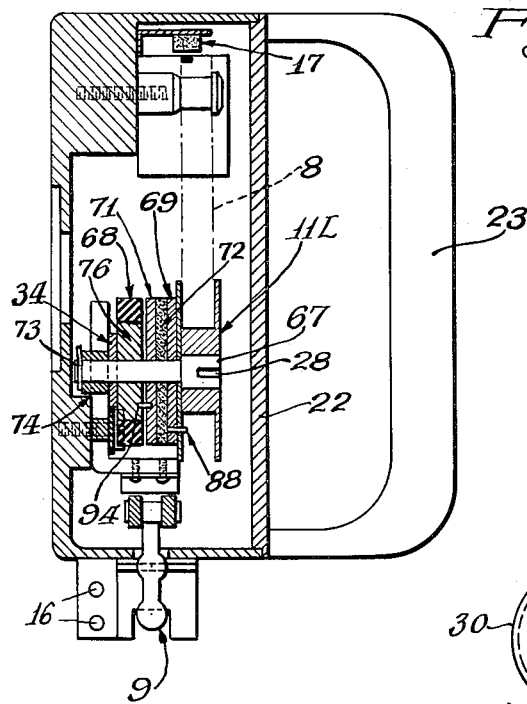
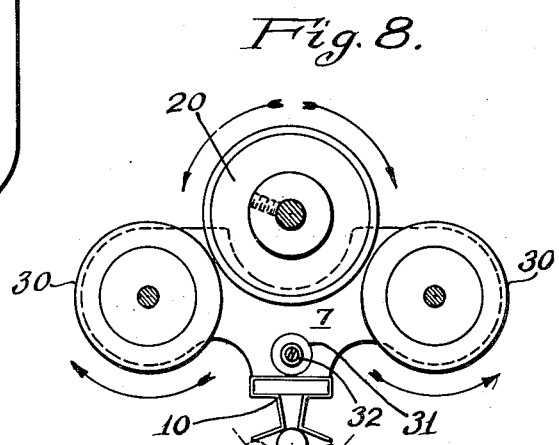
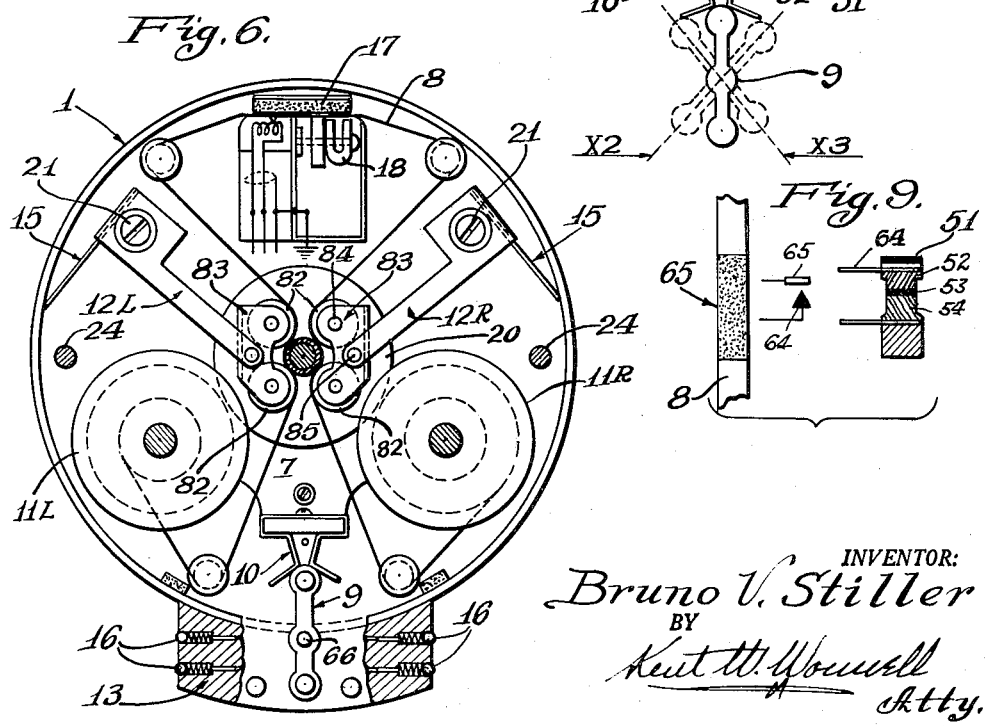
INVENTOR:
Bruno V. Stiller March 6, 1962
B. V. STILLER
3,023,851
ELECTRONIC MARKETING SYSTEM AND APPARATUS
Original Filed May 31, 1952
7 Sheets-Sheet 6
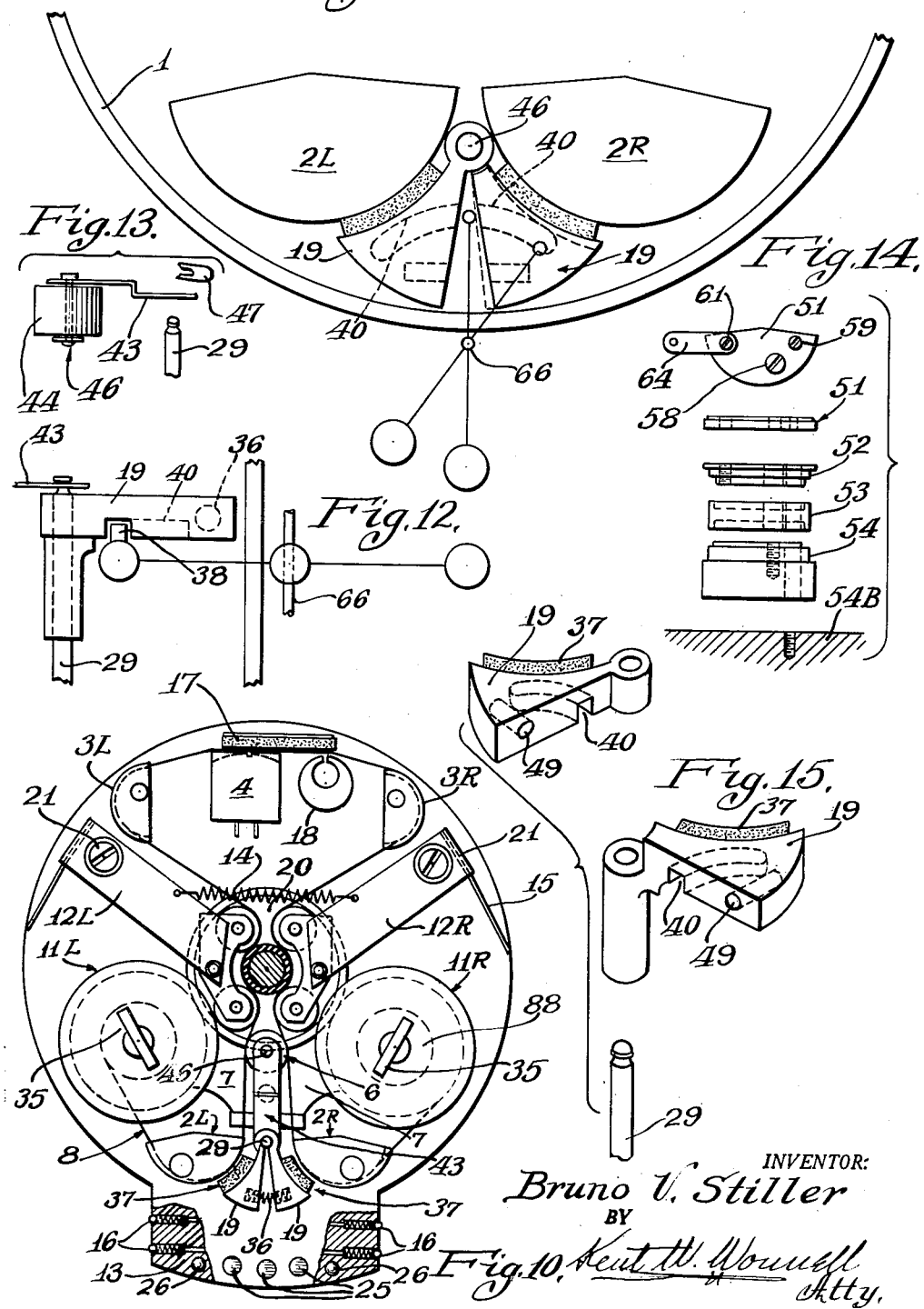

United States Patent Office 3,023,851
Patented Mar. 6, 1962

3,023,851
ELECTRONIC MARKETING SYSTEM
AND APPARATUS
Bruno V. Stiller, Deerfield, Ill.
Continuation of abandoned application Ser. No. 290,969,
May 31, 1952. This application Apr. 8, 1957, Ser. No.
651,550
8 Claims. (Cl. 186—1)

This invention relates in general to a system and apparatus for selecting, delivering and totalizing the costs of goods sold by electronic controlling devices which actuate certain mechanical devices for delivering selected goods in accordance with display samples.

This is a continuation of copending application, Serial No. 290,969, filed May 31, 1952 and now abandoned.

The invention is described in connection with store apparatus in which a customer selects goods from display samples by inserting an electronic tape recording key device in a receptacle of a cabinet, recording the merchandise desired from that cabinet, and proceeding to other cabinets if desired for other goods. After the selection is complete, the customer takes a key to a delivery or cashier location where the key recording device is inserted by the cashier in another receptacle. The record is reversed and the selected goods are caused to be discharged from storage compartments upon a common carrier which delivers them to an assembling and delivery location where the selected goods may be placed in a package ready for delivery. At the same time, the key recording device transmits to a register the separate charges for the goods selected which are totaled and presented to the customer as a complete bill for the goods selected.

The key recording device comprises a portable unit having a magnetizable wire or tape which is movable in one direction for picking up and recording sounds of different frequencies, representing goods selected from a cabinet, for example, and is then removable for insertion in another receiver at the cashier's desk in which the direction of the tape is reversed. The recorded sounds and frequencies are reproduced in a reverse order for actuating the mechanical devices which deliver the selected goods upon a common carirer such as a belt, and then the record of the sound on the tape is removed for reuse of the device by other customers in the same cycle.

The price of each selected article is also recorded electronically upon the tape so that when the tape of the reproducing device is reversed, the costs of all the selected goods or articles are reproduced at a cashier's desk so that by the time the goods are delivered, the costs of the selected articles are totalized and may be paid for by the customer.

An important object of the invention is to provide a portable device for recording, transferring and reproducing electronic impulses set up in selecting articles or goods at predetermined prices.

Another object of the invention is to provide a portable recording and reproducing device which operates in accordance with electronically set up sound impulses and cooperates with different receivers to move the recording element in one direction when the device is applied thereto and to move the recording element in the other direction to reproduce the sounds received thereby.

A further object of the invention is to provide an electronic recording and reproducing device which automatically actuates motive means for moving a recording tape in one direction or the other depending upon the receiver in which it is inserted.

A still further object of the invention is to provide a recording and reproducing device which receives pulses of different wave lengths alone or in combination with each other to automatically actuate delivery mechanism for the selected articles in accordance with the pulses and to deliver recorded pulses automatically set up as the prices of the selected goods and totalized automatically when the device is operated to reproduce the recorded pulses for the goods delivered.

A further object of the invention is to provide an electronic marketing system in which a portable key device is used to receive electronic impulses of different wave lengths depending upon manual selection of articles and record the sound impulse upon movable tape, the key device being then removed and inserted in a receptacle therefor at another location where the movement of the tape is reversed, and the sounds recorded upon the tape are electronically reproduced for actuating a delivery mechanism and also for setting up a price indication upon a recording register, the delivery mechanism including a carrier system for delivering the selected goods to a common point for packaging, and the price indicating means including a totalizer for recording the costs of the separate articles and the total of all the costs.

Other objects of the invention will appear in the specification and will be apparent from the accompanying drawings in which:

FIG. 3 is a diagrammatic representation of the circuits set up when the recording key device is placed in the cashier's receiving set for reproducing the sounds from the tape and for thereby actuating corresponding electronic means for delivering selected goods and for recording and totaling the cost thereof in accordance with the selections on the tape;

FIG. 4 is a wiring diagram of the cashier's receptacle circuits for the motor assembly;

FIG. 6 is a plan view of the electronic recording key device omitting some of the overlying parts;

FIG. 7 is a sectional view of the key device shown in FIG. 4;

FIG. 8 is an enlarged plan view partly in section of the tape winding and moving device of the key shown in FIG. 6;

FIG. 9 is a somewhat diagrammatic assembly of three parts to illustrate the operation of the circuit closer on the sound tape of the key device;

FIG. 10 is a more complete plan view of the key device than in FIG. 6;

FIG. 11 is a fragmentary enlarged view of the lower edge of the key device with the drag arms mounted therein; and representing the operation of the key lever thereon somewhat diagrammatically;

FIG. 12 shows a side view of the mounting of one of the drag arms as represented in FIG. 11;

FIG. 13 is an assembly of three parts of one of the recording tape slack idlers;

FIG. 14 is an exploded view showing the parts of the limit switch assembly;

FIG. 15 is an assembly of three parts, in perspective, of the drag arm assembly.

Magnetic wire or tape recorders are now commonly used for dictating, reproducing conversations, music and various sounds, but the present invention is designed and intended for recording sounds of different frequencies for distinguishing the selection of different characteristics or numbers, such for example, as the selection of different combinations of frequencies in sets representing numbers from 1 to 100 or more. These sets of numbers are obtained when the recording device is placed in a certain position in a receptacle. The numbers or characters are then recorded by the tape recorder, and the device is removed and placed in another receptacle in which the tape is moved reversely in direction, the different frequencies are reproduced by the device from the tape, and these different frequencies are picked up and amplified by electronic means. A suitable device may be operated thereby for selecting articles corresponding to the numbers or characters received by the device in its recording position and for tabulating the costs of the selected articles so that the sum thereof may be totaled.

Thus, for example, this system may be used in selecting any one or more of a group of articles which have a certain price per article. The recording device may be used in several receivers in this manner for selecting a number of articles to be purchased. The device is then removed from the recording receiver and is placed in a reproducing receiver where the various signals produced by the different frequencies are decoded, reproduced and amplified by electronic means for delivering the articles selected by the device and for automatically assembling and totalizing the costs of the various articles selected. This is one example of the way in which the recording and reproducing device may be used for selecting articles from a large stock and causing them to be assembled and a proper charge made for them at a dispensing station, as in a store or market.

Figure 1:
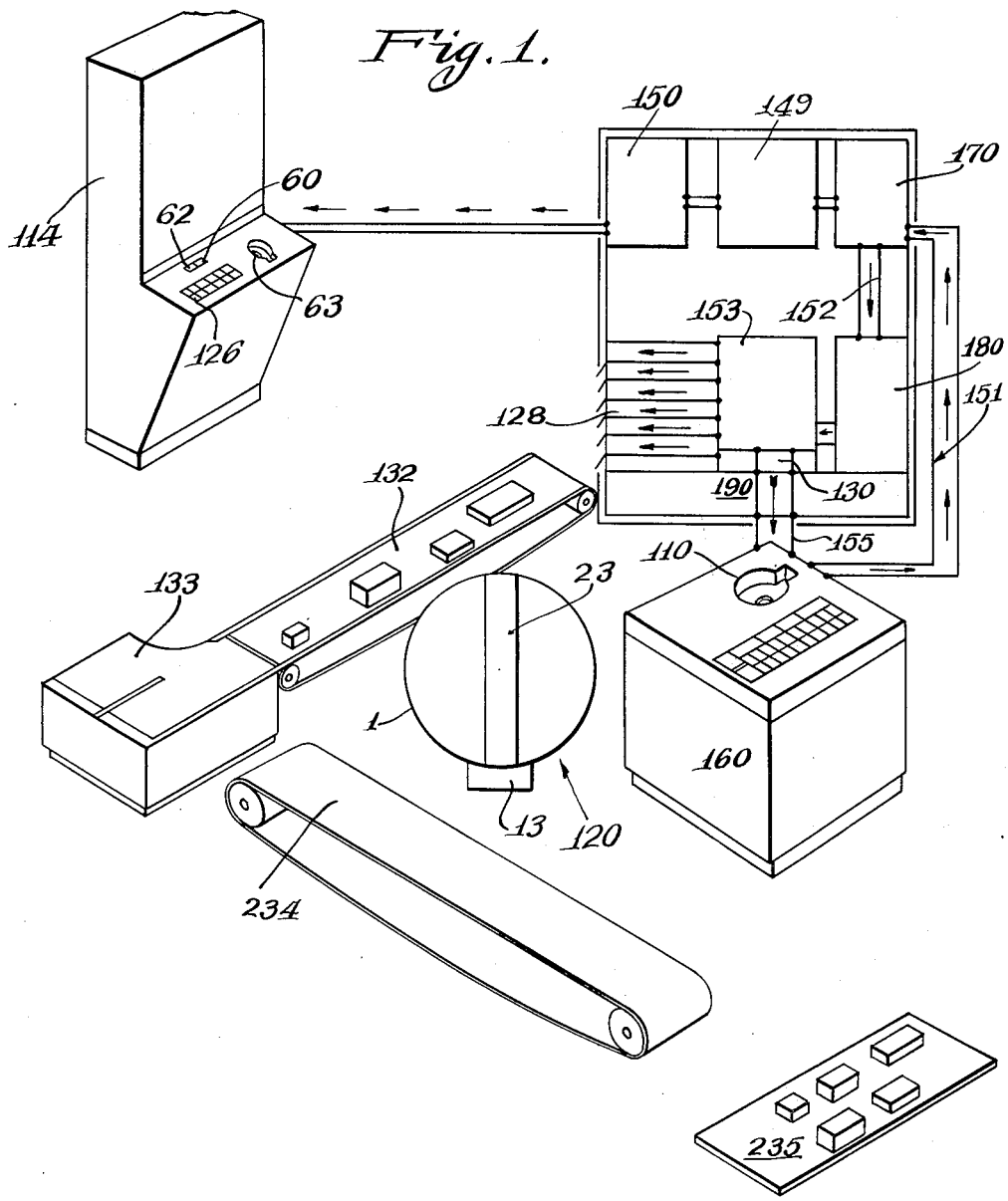
FIG. 1 is a diagrammatic representation of a marketing system showing a number of the operating parts in accordance with this marketing system.

Referring generally to FIG. 1, a store apparatus utilizing this electronic marketing system comprises a number of recording and reproducing key devices which may be used by various customers of which only one device 120 is shown. The key device has a handle 23 and a projecting plug 13 and is adapted to be inserted in a receptacle 63 of a cabinet 114 which contains a variety of goods or merchandise for selection. A number of these cabinets are provided depending upon the variety of goods to be sold. A complete store has a number of cabinets containing only a sample of each of the articles offered for sale accompanied by a designation of the cost of units of the goods displayed.

Each cabinet has two banks of keys 126 for making a selection, one bank having different keys denoted by different letters of the alphabet, and the other bank having different keys designated by different numbers. As soon as two of the keys are depressed, an actuating circuit is set up in a recording device 120 for actuating recording tape as hereinafter described, and electronic circuits of different frequencies are transmitted by conductors 156 from an oscillator 150 for setting up different sounds on the tape in accordance with the selecting buttons 126 which are operated.

After a customer has made his selections from a single cabinet 114, or a number of cabinets, the recording device 120 is removed from a receptacle 63 and is taken to a cashier's desk 160 which has a receptacle 110 to receive the recording and reproducing device 120. The selected frequencies which have been electronically impressed upon a tape 8 (FIG. 6) of the device 120 are then played back through a cashier's receiver 110 by moving the tape in the opposite direction. The sound from the tape is played through an amplifier in the cashier's desk and directly therefrom through conductors 151 to a filter 170. From this filter 170, pulses are fed through conductors 152 in sequence groups of three pulses into a chain relay selector 180. The last pulse of each group of three is fed into a slave relay 153 (see also FIG. 5), thence through suitable conductors 154 into digit panel 156, and through jumpers 130 into a pricing panel 190.

The pulse is fed into a digit solenoid operated register 200 from the variable pricing panel 190 through a multicable. This sends a pulse which actuates a predetermined unit of a merchandise kick-out device and also through conductors as hereafter traced which actuates a solenoid operated cash register at the cashier's desk 160.

While merchandise is being kicked out from a merchandise unit 128, a pricing ticket is simultaneously added and printed in the solenoid operated cash register (not shown) at the cashier's desk 160 as hereafter set forth.

After a customer has made numerous selections with the key device at various selector cabinets 114, the key is brought to the cashier's desk 160. The cashier inserts the key 120 into the receptacle 110 and turns the key in a counter-clockwise direction. The projection 13 of the key housing carries a micro-switch 55 (see also FIG. 4) which is actuated when the key is turned counter-clockwise and this switch closes a circuit which starts a synchronous motor 50.

A circuit is also closed from an A.C. source of current at 115 volts for transformer 57 and for a 90 volt rectifier 300. A 24 volt direct current rectifier 118 now connects a cashier's button 195 (see also FIG. 3) with a negative source of power. This causes a green light indicator 196 to be illuminated which signifies that the cashier's receptacle 110 is ready to receive signals or a replay from the key 120. As soon as the cashier presses the cashier's button 195, the following occurs: The negative connection is switched over to a conductor 197 causing red indicator lamps 198 to light up and green lamp 196 to go out. The normally open switch 199 supplies a 90 volt positive D.C. to a magnetic clutch 48 (see also FIG. 16) which causes the clutch to pull in its armature 27 which gives a capstan 5 the sufficient rotating power to move the tape 8. This clutch 48 moves clockwise in the cashier's receptacle 110 directly opposite from the way the clutches and motors run in the customer's selector cabinet 114. In other words, the tape in the key 120 travels now in a clockwise direction and pulses come off from the tape as it travels over a recording head 4 (FIG. 10). The last pulse recorded in a customer's selection cabinet 114 comes off first in the cashier's receptacle 110, and the other pulses follow accordingly.

When all pulses are taken from the key device 120, the tape 8 in the key approaches the end and a metal coating 65 (see also FIG. 9) thereon closes a limit switch 2L (FIG. 10). A relay R3 (FIG. 4) is actuated which opens two normally closed contacts 90, the first contact disconnecting a battery connection from the indicator lights 196 and 198 and the second contact of the relay disconnects the 90 volt D.C. positive current supply from the clutch which brings the capstan drive 5 (FIG. 8) to an instantaneous stop and prevents the tape from coming off from the spool. The indicator lights 196 and 198 now being out, show that all pulses have been taken away from the key 120 which is now ready for reuse because the tape 8 has been demagnetized by an erase magnet 18.

The recording key 120 comprises a shell housing 1 (FIGS. 6–16) which may be approximately 4" in diameter containing two winding spools 11L and 11R symmetrically located at opposite sides of a center line for winding the recording tape 8 thereon which also passes over two limit switches 2L and 2R. The tape also passes over two guide posts 3L and 3R between which is a recording head 4 and a permanent erase magnet, the tape moving under a pressure erase pad 17 which overlies the recording head and the erase magnet. In the center is a capstan drive 5 with a pivoted spool cradle 7 mounted on the center line for carrying the spools 11L and 11R. At the lower end of the cradle in FIG. 6 is a tension shift spring 10 which engages the upper end of a switching lever 9 (see also FIG. 6) and tending to press the cradle resiliently in a direction opposite to the movement of the switchnig lever 9 at its lower end which extends into the projecting key housing 13. Above the spools are pressure arms 12L and 12R pivotally mounted on screws 21 extending into the bottom of the shell housing and having a tension spring 15 extending from each arm into contact with the adjacent inner wall of the shell housing tending to press the tape against a projecting end 81 of the capstan bar which passes between rollers 82 spaced apart and mounted in a housing 83 by means of pivot pins 84, each housing being mounted for separate pivotal movement upon a pivot pin 85 at the end of one of the arms 12L or 12R.

In FIG. 10, the arms 12L and 12R are shown drawn together by a tension spring 14. Also as shown more clearly in FIGS. 10, 14 and 15 is an assembly of drag arms 19 with felt pads 37 on a curved portion of each arm for engaging the tape as it passes over adjacent limit switches 2L and 2R. Mounted on the capstan bar is a drive spool 20 which projects between and engages the spool clutch surfaces 30 depending upon which direction the cradle 7 is rocked.

At the sides of the projection 13 are spring pressed contacts 16 for making electrical connections as hereinafter set forth depending upon the direction in which the key device is turned when inserted either in customer's receptacle 63 or the cashier's receptacle 110. Also in one face of the projection are limit switch contacts 25 which may engage spring pressed contacts (like contacts 16) when the key device is turned in one position or the other and at the sides of the contacts 25 are locking dimples 26 for engaging projecting bearing balls similar to the spring pressed contact 16. A key carrying handle 23 (FIG. 7) may be attached to a key cover 22 and the cover attached to the housing 1 (FIG. 16) by screws 24 extending to the base thereof.

In the drive mechanism (see FIG. 16) is a clutch armature disc 27 attached to a non-magnetic shaft 78 mounted in a capstan drive bearing 33 and suitably related to a clutch assembly bearing 34 as shown in section in FIG. 7 having a spool clutch shaft 67 with a slot 28 in the end of the shaft for removing or relatively turning the spool. The cradle 7 may be mounted upon a bearing 31 by means of a cradle mounting screw 32 as shown more clearly in FIG. 8.

Figure 16:
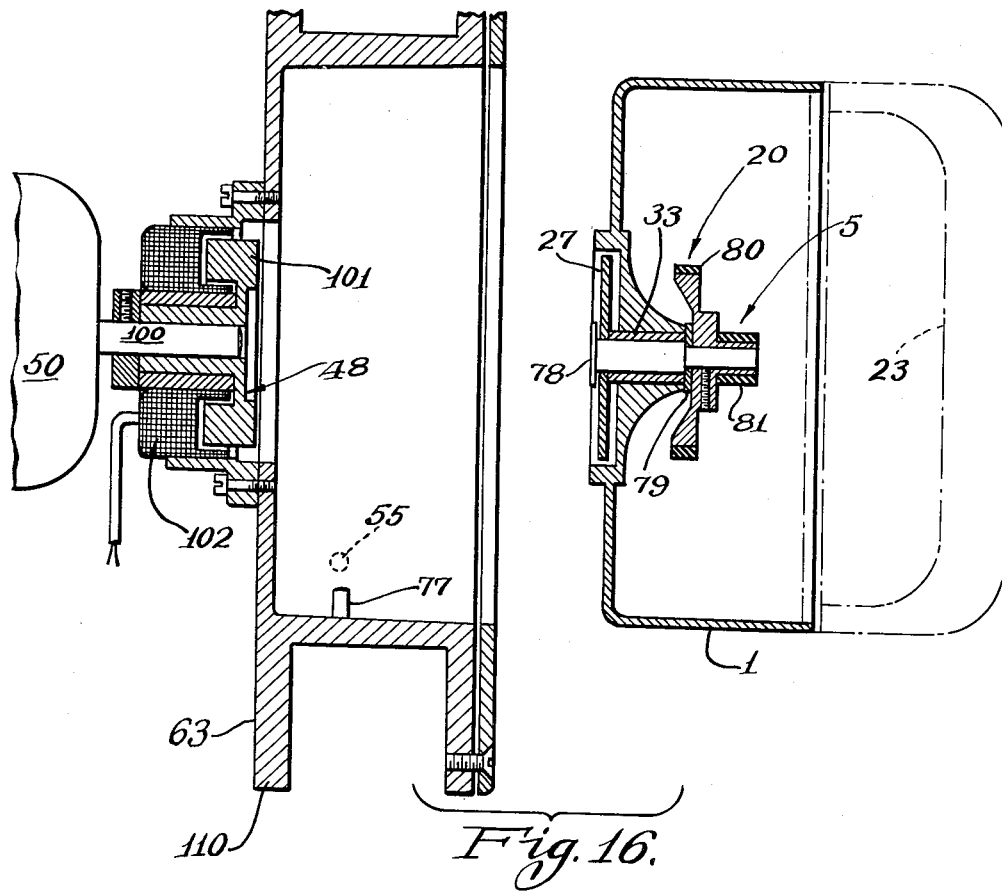
FIG. 16 is a sectional exploded view of a key device receptacle and a magnetic clutch motor drive as used in driving a key device magnetic spool omitting the other key device parts.

The drag arm assembly may be mounted upon a pivot pin 29 supported by the cradle 7 and extending through the bearing portion of the drag arms as also shown in FIGS. 15 and 16 and the upper end of the pin carrying the slack idler nylon roller 44 mounted on a bracket 43 and connected to the top of a pivot pin 46 for the roller by means of an open spring locking washer 47.

The spools 11L and 11R hold the recording tape 8 which may be of plastic, paper or other suitable material coated for sound transmission. The capstan drive 5 derives its motive power from a synchronous motor 50 to which it is coupled by the magnetic clutch 48 and causes a movement of the tape 8 over the permanent magnet 18, thence over the recording head 4 guided by the guide posts 3L and 3R and pressed downwardly against the magnet and head by a pressure pad 17, again touching and partially winding around the capstan 5, gliding past slack idler roller 6 and over limit switch 2L to be wound up by tape spool 11L which derives its motive power from the capstan drive wheel 20 which constitutes the spool drive.

Figure 2:
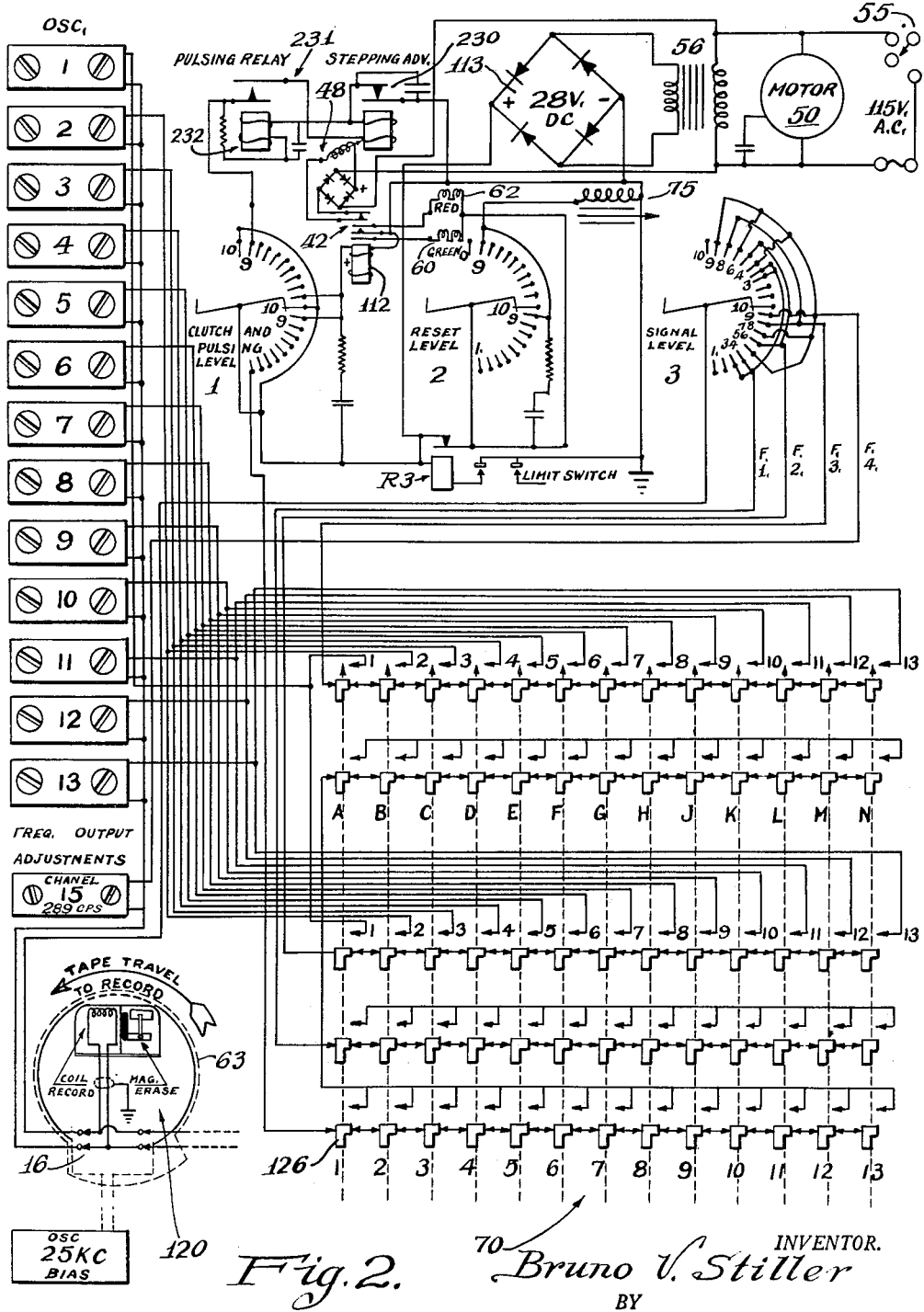
FIG. 2 is a diagrammatic representation of the recording key device and the electronic means for setting up different sound combinations from circuits of different frequencies.

When the key device 120 is inserted in a customer's receptacle 63 (see also FIGS. 2 and 4) and turned clockwise approximately 45°, the following occurs: The movement of the key projecting housing 13 has actuated a microswitch 55 and a green signal lamp 60 is lighted. A step-down transformer 56 is energized and the synchronous motor 50 is connected for operation. When a customer selects push button 126, the green light 60 is extinguished and a red lamp 62 is lighted. When the second button 126 is pressed down, two things occur: First, a 24 volt D.C. positive connection is made with a pulsing relay 231 which in conjunction with a step advance relay 230 and then with resistor-condenser (RC components) 232 which supply the motive power for the pulsing relay 231.

A cycle of ten steps has now been started by the pulsing relay; level one of this relay 231 may be called the clutch and pulsing level. On contact one to nine inclusive also, clutch relay 112 is energized. This switches negative 3R from green indicator light 60 to red indicator light 62. Also a set of normally open contacts 42 are now closed, furnishing the magnetic clutch 48 with 90 volts D.C. from a 300 mil. rectifier which now engages key 120 and makes possible the driving of capstan 5. The armature disc 27 contained in the key device (FIG. 16) is now locked in and held secure to the rotor 101 by the magnetization of the stationary field 102 of the magnetic clutch 48. The capstan in the key device is now travelling at the same speed as the motor shaft 100. The length of time the capstan travels is determined by the clutch and pulsing level 1 in the stepping relay 231.

Pulses are now being recorded, being fed through signal level 3 and recording head 4 on tape 8 or other recording media. The reset level 2 of this same stepping relay 231 controls the solenoid 75 which resets the push buttons 126 which is accomplished on step nine. Signal level 3 applies the various signals to the recording head 4 so that they are recorded on the tape. The first two steps are blank in order to give the clutch time to pull in and drive the tape. The next two steps apply F1 to the head and the particular frequency of this signal is determined by the combination of operated buttons 126. This tone is supplied during two of the switch steps in order that it will be of sufficient duration for a kick-out solenoid to operate and dispense an article from merchandise unit 128 (FIG. 1). It will be recalled that the tape is driven in reverse direction when the cashier replays the record so that this tone, F1, will be the final signal which causes operation of the merchandising unit to dispense the particular article. The next step of signal 3 will apply a tone F4 from oscillator 15 to the tape and this is a safety tone the function of which will be explained subsequently. The next step of the signal level applies tone F2 to the recording head and the following step applies a further pulse of the safety tone F4 to the head. The eighth step applies tone F3 to the recording head and the ninth step applies a further pulse of the safety tone thereto. Tones F2 and F3 are also determined by operated sections of switches 126. Each switch step may be of the order of 50 milliseconds thus requiring approximately ½ second in order to effect recording of each customer selection.

When all of the selections have been completed by a customer (from cabinet 114) the recording device 1 is presented to the cashier at desk 160 (FIGS. 1 and 3). The unit is placed in receptacle 110 and rotated in a counterclockwise direction to lock it in place after which button 195 is operated to cause the tape to be driven in a reverse or clockwise direction.

As shown in FIG. 10, this will cause pad 37 to urge the tape against limit switch 2L as the tape is pulled past the head 4 for the play-back operation. Tension for the drag arm assembly 19 (FIGS. 11 and 12) is obtained by a spring 36, the ends of which are retained in round recesses 49 in the drag arms.

Motion of the drag arms is obtained by an operating pin 38 which is part of the switching lever 9, shown in FIG. 12. Full movement of the operating pin 38 engaging one operating arm 19 on its free end enters one or the other of the slots 40 in the bottom side of each of the drag arms 19. This causes an inward motion of the drag arm 19 engaged by the operating pin 38, as it may be noted (from FIG. 11) that the centers of the radius of the curved slots 40 in the drag arms 19 are offset slightly from the center 66 upon which the operating arm 38 is pivoted.

The assembly with each slack idler 6 includes a nylon roller 44 mounted on a pin 46 carried by a bracket 43 mounted at the end of a pivot pin 29 by a locking open end washer 47. This assembly is necessary to take up any slack that accidentally develops in the tape 8 and also insures separation of portions of the tape which travel in opposite directions on the capstan 5 when it is in motion. This slack idler assembly is mounted and locked upon the same mounting pin 29 which holds the drag arm assembly.

The limit switch assembly (see FIGS. 9 and 14) for switches 2L and 2R comprises shaped discs 51 and 52 each preferably in the form approximately of a half-moon stacked alternately, first a metal and then a plastic insulator. Starting from the top, there is an insulator 51, a metal contact disc 52, an insulator 53, and a second contact metal disc 54. A screw 58 inserted through the discs holds each assembly together, and a mounting screw 59 is provided for attaching each limit switch assembly to a grounded base 58B for the limit switch 2L or 2R. A screw 61 makes contact with the metal disc 52 and an extending lug 64 is the energized side of the limit switch assembly. Suitable electrical connections (see also FIGS. 3 and 10) are made from the lug 64 to a center contact 25 in the projecting part 13 of the key device. This limit switch assembly constitutes a normally open contact switch which is closed by a metallic coating 65 near each end of the tape 8 which extends along the tape for a distance of about one inch or more. When this metallic coating travels over the limit switch assembly 2R, it engages metal discs 52 and 54 and causes the equivalent of a closed contact like a normally open switch being closed. On a customer selector panel, relay R3 (see FIGS. 2 and 4) is energized causing its normally closed contacts 90 to open which disconnects a positive battery connection from the push button contacts 126 of the customer's cabinet. As long as this relay stays open, contacts for the push buttons 126 cannot start a cycle operation of a stepping relay 131, and consequently the customer's selector panel is inoperative. This also prevents the tape 8 from moving off from the spool 11R.

Thus the projecing key housing 13 serves as an actuator for a micro-switch 55 (see FIGS. 4 and 6) in female receptacles therefor; it provides a mounting for four contact pins 16 suitably connected to the recording head 4; and it provides a mounting for a switching lever 9 by means of the pin 66. Two screws 87 (not shown) are used for mounting the projector key housing 13. On the bottom side of the key housing are located three contacts 25, to which suitable limit switches are connected. Of these, limit switches 2R and 2L lead to the relay R3 when the key is inserted in a receptacle.

A switching lever bar 9 as shown in FIG. 8, is held in position by a tension shift spring 10, either in position X2 or X3. When in the position X3, the spool clutch drive wheel 76 (FIG. 7) is engaged by the capstan drive wheel 20. When the key is then inserted in the customer's receptacle 63, there is a switch bar actuator 77 (FIG. 16) which forces the switch bar lever 9 to the right position X3 and the other end of the switch bar exerts a pressure on the tension shift spring 10 which forces the spool cradle 7 to the right. At this time, the spool drive wheel 76 is engaged with the capstan drive wheel 20. All customer selection clutches and motors turn counter-clockwise and therefore the capstan drive 5 turns counter-clockwise. Consequently the drive wheel 20 which powers the clutch spool drive 76 is winding tape on the spool 11L clockwise when it is recording. The spool 11R is now idle because the spool drive 20 is disengaged therefrom during recording.

When the key device 120 is inserted in the cashier's receptable 110, a reverse operation occurs: a switch bar actuator 77 (as in FIG. 16) in the cashier's receptacle forces the switch bar lever 9 of the key device to the left into a position X2. When the key has been turned approximately 45° to the left, or counter-clockwise, the other end of the switching lever 9 is now in position X2 and having exerted pressure on the tension shift spring 10, the spool cradle 7 is tilted to the left and engages the clutch driving wheel 76 with the capstan drive wheel 20. The motor 50 and a magnetic clutch rotor 101 travel clockwise and therefore the capstan 5 travels clockwise when the key device is replayed. This causes the spool drive wheel 76 and the spool 11R to travel in a counter-clockwise manner. Spool 11L is now idle because the spool drive 76 is disengaged therefrom.

A spool 11L as shown in FIG. 7 is anchored to a spool clutch disc plate 69 by a pin 88 and a plate disc 71 at the other side of a spool clutch friction felt 72, is anchored by a pin 94 to the drive wheel 76. Each spool is prevented from disengagement from its clutch disc 71 by a spool locking clip (see also FIG. 10). These are curled pieces of resilient metal each held tightly when inserted in a slot 28 in the outer end of shaft 67 of the spool clutch drive wheel 76.

The capstan drive 5 (FIG. 16) comprises a magnetic clutch armature 27 mounted at the end of a non-magnetic shaft 78. A spacer washer 79 on the shaft separates the spool drive wheel 20 from the end of a capstan drive bearing 33. The drive wheel has a rubber cover 80 for more efficient friction, and there is a rubber cover 81 for the end of the capstan for a more efficient friction drive or movement of the recording tape. The recording tape is pressed against the cover 81 of the capstan 5 by pairs of rollers 82 which are mounted in a housing 83 pivoted on a pin 84. Each roller housing is supported at one end of a pressure arm 12L or 12R by a pivot pin 85. Pressure arm 12L and 12R are mounted in the key device upon locking screws 21 and each has a spring 15 extending therefrom in contact with the inside of the casing 1 to provide pressure and a coil spring 14 (FIG. 10) connected at its ends to the pressure arms, presses the recording tape against capstan 5 by means of pressure rollers 82.

When recording signals at a customer selecting cabinet 114, the key 120 is inserted in the female receptacle 63 and turned approximately 45° clockwise by the customer. The switching lever 9 in the key is pushed to the right by a cam action, the lever being rotated upon a pivot 66 which causes the opposite end of a switching lever X3 to exert pressure on a cradle tension shift spring 10. This causes a spool clutch drive wheel 76 to engage a capstan drive wheel 20. The drive wheel 76 being somewhat smaller in diameter than the capstan drive wheel 20 naturally will cause the clutch drive wheel to make more rotations per second than the capstan drive wheel 20. This is desirable because when the recording tape 8 starts to wind on a spool which is locked by the pin 88 to the clutch disc 69, the clutch friction felt 72 makes it possible to allow the proper amount of slippage as the diameter of the wound-up tape increases, and consequently the tape spool 11R will require a slower speed in relation to the drive wheel of the capstan 20.

All of this action occurs when recording is being effected by a customer in the customer's female receptacle 63. When the key is inserted in the cashier's receptacle 110, the action is just the reverse. The actuator 77 is located in the female receptacle 63 on the left side and on the right side in the cashier's receptacle 110.

In the key device at the outer sides of the recording head 4 and the erase magnet 18 are two tape guide posts 3L and 3R, each shaped like a half moon and having a shallow machined recess to receive and facilitate the guiding of the tape in a smooth manner.

The permanent erase magnet 18 is preferably of the circular type with a gap facing the tape so that the tape is demagnetized in a very efficient manner as it passes the magnet with the help of the pressure pad 17 which also exerts pressure on the recording head simultaneously.

Figure 5:
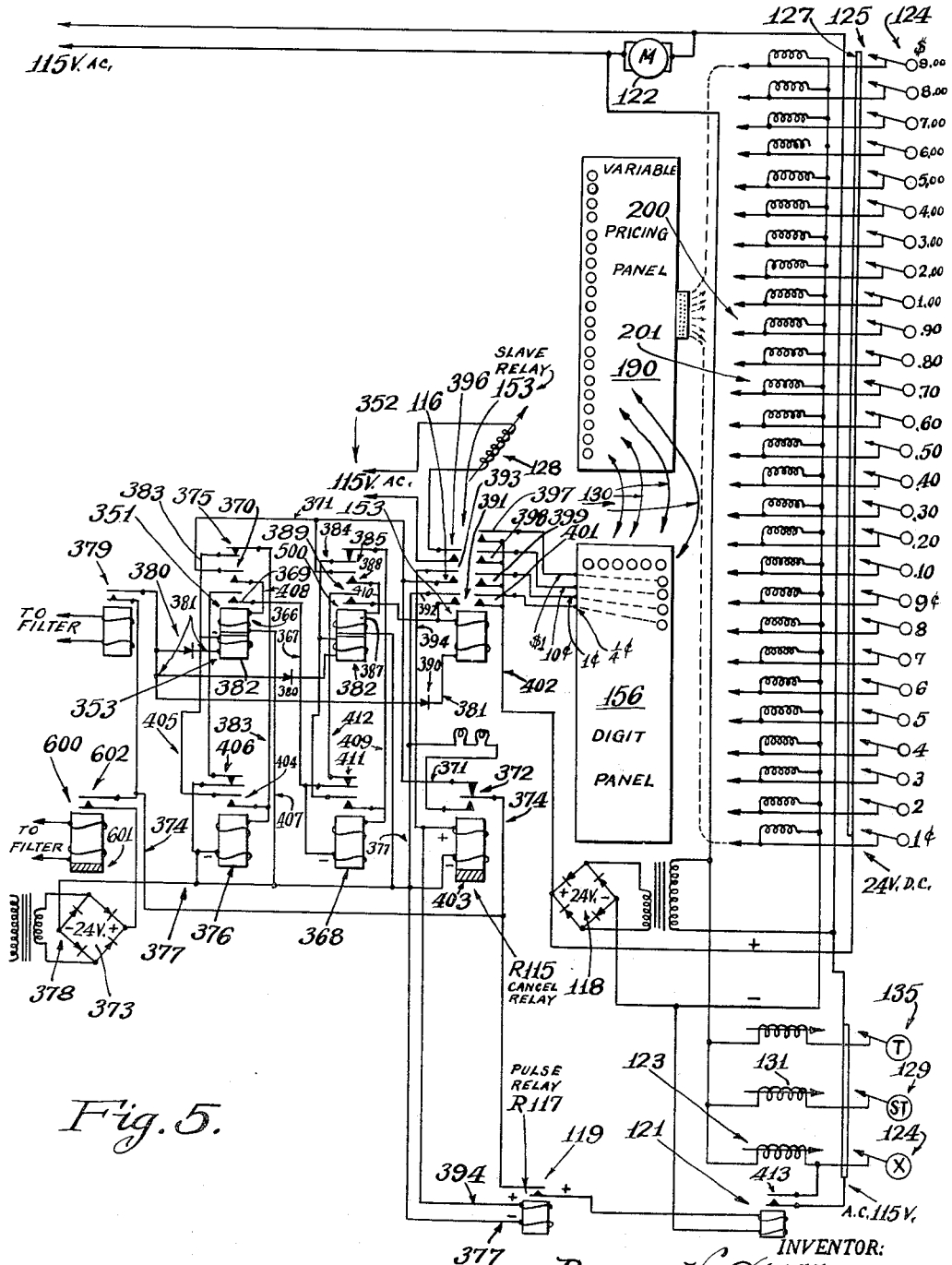
FIG. 5 is a wiring diagram of the discriminator circuit and its connection with the cash register actuators.

A register 200 as represented in FIG. 5, receives pulses from a slave relay 152 to operate digit solenoids 201 in the register. A cancel relay R115 becomes energized from contacts 116 of the slave relay 153 and simultaneously a pulse relay R117 is energized and closes contacts (at 372) furnishing 24 volt D.C. from a rectifier 118 through contacts 119 to a register actuator (300 ohm) relay 121 which actuates (30 ohm) 115 volt A.C. solenoid 123 which cycles the cash register motor 122.

Every time a slave relay 153 (one for each item in the store) is energized for about fifty milliseconds, a register motor 122 makes one complete operating cycle. The 24-volt D.C. digit solenoids in the register may be operated manually to add a sales' tax to be sub-total. This is done by manually pressing push buttons 124 which are connected suitably to normally open contacts 125, one side of which is connected by a common actuation bar 127 to the 24-volt D.C. rectifier 118.

When the digit solenoids 201 are operated by the original actuation of the 153 slave relays (one for each corresponding item), the cash register motor 122 is actuated, and by various levers and cam actions not herein specifically shown, a printed record is made on a suitable paper tape of the price of each separate item which is predetermined by jumper wires 130 connected from the digit panel 156 to a variable pricing panel X190.

When all the pulses are taken by a cashier from a key device 120 and the tape has come to the end, indicator lamps 196 and 198 are extinguished by the circuit closing action of the metallic coating 65 on the tape. The cashier now presses a sub-total button 129 which actuates a (30 ohm 115 volt) A.C. solenoid 131 which energizes the cash register motor 122 through suitable levers and cam actions as described as the cycle operation of the register, and by mechanical means in the register, the added sub-total now appears in a small lighted viewing window 134 (FIG. 3) located in the top of the register.

To the sub-total, the cashier now adds the sales' tax, if necessary, by means of sales' tax button 124 which actuates digit solenoids in the adding machine and thereupon presses a total button which actuates a total solenoid 135. This cycles the motor 122 in the way previously described, and by suitable cash register means, the grand total is printed on the paper tape which may be in duplicate, the outer tape being cut off and providing a printed customer's receipt which is ejected through a customer receipt ejection slot 137. The customer pays whatever grand total is printed and receives his merchandise which by this time has arrived (see FIG. 1) upon an endless conveyor belt 132 at a receiving table 133. Some of the merchandise may be primarily packaged on the table 133 and the goods then placed upon a second conveyor 234 for delivering the merchandise to an outer or outdoor loading platform 235. A customer having paid his bill at the cashier's desk 160 receives an identification ticket which is delivered to an attendant at the loading station 235 who delivers the packaged merchandise to the customer who may then transfer it into his automobile or carry it away.

A more detailed description of the discriminator operation and the circuits closed will now be set forth.

The first frequency which is fed into a selector relay 351 (FIG. 5) causes current to travel through a selenium rectifier 380, thence through a conductor 381 to energize a pulse coil 382 temporarily, causing it to be energized and to close a circuit by way of contacts 369 which now energizes the (100 ohm) locking coil 366 which is part of the same relay (double wound coil on relay 351). The negative side of this coil has a ground connection through a conductor 383 and contacts 375 continuing through conductor 383, contacts 404 to and through steering relay 376 into a conductor 377 to the negative side of the power source 378.

When this first pulse is made by contacts 379, this not only causes the relay 351 to be energized but also the steering relay 376 becomes energized. This causes the following to occur: Contacts 404 which are normally open on the steering relay 376 are closed, which transfers the negative or ground from the conductor 383 to the negative side of (75 ohm) coil 382 of selector relay 351 by means of conductor 405. This is only a momentary condition because this same coil 382 has deprived itself of a negative or ground connection through the opening of contacts 375 which lead to the conductor 383 through the steering relay 376, then through conductor 377 to the source of power 373 and to the negative side 378 which is the ground. A natural pulse which was made by the momentary closing of contacts 379 and of a duration of 25 milliseconds or slightly longer, performs this function in this manner. Both coils 382 in the selector relay 351 and that of the steering relay 376 which are in series are energized and pulled in simultaneously. Contacts 404 transfer the negative connection which makes this operation possible. Another action occurs which is that normally closed contacts 406 on relay 376 open up momentarily but close immediately when the steering relay 376 returns to its original position.

Contacts 369 on the selector relay 351 now stay closed by the locking action of the (100 ohm) coil 366. This is the signal forwarding negative line conductor 367 which is the connecting means for connecting the ground or negative to whichever corresponding bank has been selected.

The pulse coil 382 has now performed its duty by pulling in contacts 369 and 370 and opening up normally closed contacts 375. However, the closing of the contacts 370 has supplied the selector relay 351 with a positive current. The selector relay comprises a double wound coil of which one coil section 382 may be a 75 ohm coil which acts as a pulse and operating coil in this relay and another coil 366 is a 100 ohm coil which acts as an electrical locking device coil. The negative side of this coil 366 is permanently connected to the ground (negative side of rectifier 373) by means of conductors 407 and the positive side 408 of the coil is connected through contacts 370 and receives a positive connection through conductor 371. Current in the locking coil 366 causes the relay to stay closed until the cycle operation removes the positive connection which is accomplished by the opening of contacts 372 of the cancel relay R115.

Returning to the relay 351, the closing of contacts 369 as pointed out, selects its corresponding bank relay 500 (501 to 513 inclusive not being shown) through a conductor forwarding negative conductor 367 which connects the negative on the ground of the steering relay 368 of the corresponding bank. In explanation of the above use of the word "corresponding": There are 13 selector relays 351 and 13 banks of 13 relays each. The first relay (351) as shown corresponds and connects to bank 1; the second selector relay (not shown) corresponds to bank 2; the third selector relay (also not shown) corresponds to bank 3, and so on.

A second pulse is now received from the filter contacts 379 and enters pulse line conductor 381 through the selenium rectifier 380 and into a pulse relay coil 382. Current passes through the coil of the relay 500 and thence by way of conductor 384 and normally closed contacts 385 into the steering relay coil 368 by way of conductor 409. Since the other side of the coil 368 has a ground or negative which is supplied by negative through contacts 369 which are closed by the electric locking action of coil 366, both relays, that is, the bank steering relay 368 and the bank relay 500 are energized and pulled in simultaneously. A locking coil 387 is now energized through contacts 388 and a positive connection is now applied to it by a conductor 410.

The bank relay 500 now remains closed by operation in the same manner as the selector relay 351. The contacts 385 normally closed disc connects the negative for this bank of thirteen relays and makes this bank or any other bank inoperable. Contacts 389 are connected to contacts 411 of steering relay 368 by a conductor 412 thence through now closed contacts 389, through conductor 367 with a negative connection to that side of the coils (one only being shown) of the group slave relay 153. For the system herein described, there are one hundred and sixty-nine groups of thirteen relays.

This system is now ready to receive the third and last pulse which enters through the conductor 381 and through the selenium rectifier 390 to the positive side of a slave relay 153. Since the other side of this coil has been connected to ground or negative through the conductor 367 from the corresponding bank relay 500, the relay 153 is thereby energized and promptly pulls in. As above pointed out, every group consists of thirteen relays and only one of the one hundred and sixty-nine of such groups now has a ground connection; therefore, the third pulse will travel through the conductor 381 and will bypass anything that is not grounded and this third pulse is able to pick out and energize only one of the thirteen relays in the group that was selected by the corresponding bank 352.

When this slave relay 153 is energized, the following happens: Normally open contact 391 closes; relay 153 now receives a ground or negative connection directly through conductor 392 which continues by way of conductor 377 to the negative side 373 of the power source 373. The second set of contacts on the relay 153 of the normally open contacts 393 which are now closed, now supply the cancelling relay R115 with positive current through conductor 394 which it receives from conductor 371 from the positive source of supply. The negative side of relay R115 being permanently connected through conductor 377 to the negative or ground side of the source of power 373 by means of conductor 377 also furnishes the register pulse relay R117 with current through this same conductor. The source of the positive current is conductor 371 which extends to a make and break contact 372 and thence to a positive source through conductor 374.

A third set of contacts 396 closes the circuit of 115 volt A.C. supply and energizes a merchandise kick-out solenoid 128 which corresponds with the slave relay selected by the third pulse.

A fourth set of contacts 397 energizes the hundreds or dollar digit line solenoid in the totalizing register 200.

A fifth set of contacts 398 energizes the ten cent to ninety cent digit solenoids in the register.

The sixth set of contacts 399 energizes the one cent to nine cent digit solenoids in the register; and the Seventh set of contacts 401 energizes the quarter cent, half cent and three-quarter cent solenoids in the register.

Power is obtained for these contacts through a conductor 402 from the cashier's rectifier 118. The register pulse relay R117 which is permanently connected upon its ground side 377 receives its power through the conductor 394 from the contact 393 in the same manner as described for the cancel relay R115 when this relay is energized and pulls in. A contact 413 is the source of transfer of power to the 115 volt A.C. solenoid in the register which causes the cycling of the register. When the contacts 372 of the cancel relay R115 are open, this disconnects the positive supply from the locking coils in the selector relay 351, the bank relay 500 and also the slave relay 153, and the cycle has now been complete. The selector system is now ready to receive the next group of frequencies which are fed from the filter in groups of three into the system. However, to make sure that all of the locking coils have opened up, the cancel relay R115 has a copper slug 403 which receives a charge for causing the relay coil to retain energy for about twenty-five milliseconds or more, thereby causing the normally closed contacts 372 to stay open a short time after the current has been cut off from the coil of the relay R115. The cycle of the discriminator is now complete which is in effect, the ground finding circuit, and when the ground connections for all thirteen selectors are broken, all subsequent pulses are meaningless as far as the first thirteen selector relays 351 are concerned.

The system is now ready for the next batch of pulses which come in sequences of three. The system of selection here described and shown will work perfectly as described when the selector consists of not more than three or four selector relays 351 together with one steering relay 376 and bank relays 500 together with not more than five steering bank relays 386, but when there are thirteen selectors 351 together with one steering relay 376, and thirteen banks of thirteen relays each, with two thousand one hundred and ninty-seven slave relays, hooked in on the circuit, it is discovered that interlacing and feed back occurs, a sort of transformer action develops horizontally and also vertically in these conductors which connect the various relays in the selector bank and slave circuits. One way to stop this is to force the current to go in one direction only without backing up. In effect, it is like a trap such as a plumber uses to stop sewer gases from backing up through a drain into a house. In the present system, this can be accomplished by small selenium rectifiers (380) inserted in the connection from contacts 379 to conductor 381. A suitable selenium rectifier of this type may be small, no larger than a postage stamp, but it makes possible this complex system of selection without any back-up or feed-back.

The first pulse is fed through a selenium rectifier 380 before it enters the coil of the selector relay 351, one rectifier for each of the selector relays; the second pulse is fed (through a selenium rectifier) to each of the one hundred and sixty-nine bank relays which are arranged thirteen to a bank. The third pulse travels through a third selenium rectifier 390, that is, one for each slave relay 153, 2,197 of which are arranged in groups of thirteen slave relays each. The third pulse is the most important one because it actuates the slave relay which controls the merchandise kick-out and the cash register solenoids and also causes the cash register to go into its own cycle of operation of adding and printing. Without these selenium rectifiers placed in series in the pulse lines, the whole circuit becomes inoperable.

While this system was designed, set up and is operable as described for thirteen banks of thirteen relays each so that it will serve and discharge 2,197 different articles, it is obvious that the number of banks may be changed and the number of different articles which it will dispense may be correspondingly changed. Each time the recording and registering key device is operated in a complete cycle, the tape passes twice before the demagnetizing and erasing magnet for each time that it is magnetized, once before the tape reaches the recorder and once in the reverse direction after the pulses have been replayed so that no trace of the preceding pulses remain upon the tape.

Up until this time, in order to avoid confusion, the explanation and function of the safety channel incorporated in this system has been withheld. It has a frequency of 289 cycles per second, which I call frequence S. The object of this is to insure and serve as a positive check against a mixup in a customer's order. If, for example, a customer were to buy 15 items, this will require 15 sets of 3 pulses each and 15 complete cycle operations. If on the fifth or sixth item selected, the cycle operation five or six has erred in the middle of a cycle due to the failure of a relay to function properly, or any other cause, the 100 ohm locking coils 366 on the selector relays 351 will stay locked in. The rest of the order is therefore lost. It is obvious that these 100 ohm locking coils in the selector relays must be unlocked before new cycle operation can begin anew. For this purpose I have incorporated what I describe here as frequence S (289 c.p.s.) which will be hereafter designated as my safety channel. The function of this channel is to energize a 5,000 ohm relay 600 with a set of normally open contacts 602. These contacts are connected by suitable conductors to the positive side of the rectifier 373 and the source of power for pulse line conductors 377 and 374.

When pulses are recorded at the customer's receptacle 63, three extra pulses of the safety channel or frequency S are sandwiched between the regular frequencies on level three of the stepping relay. The regular item-selector frequencies are on contact three and four, first frequency; contact six, second frequency; contact eight, third frequency. The S frequency appears on contact five, contact seven and contact nine.

When replay occurs at the cashier's desk and as mentioned previously, the frequencies come off the tape in reverse, frequency S appears first. The 5,000 ohm relay, which also has a copper slug 601 that delays the re-opening of this relay slightly, fifty milliseconds or more, is energized and closes the positive line 374 for the chain relay selector. The next pulse one appears, which shows up in conductor 381. Due to the copper slug 601 on the 5,000 ohm relay 600, the contacts stay closed on this 5,000 ohm coil furnishing positive connection from conductor 374 to the chain relay selector 351. Then the next pulse comes from the tape, which is the frequence S, again feeding the 5,000 ohm coil 600 with the slug 601. This new pulse energizes this coil (5,000 ohm) anew, makes the coil remain closed, and makes possible the bridging of selector frequency two. Again the frequency S appears bridging the last of the selector frequencies which operates the slave relay 153 and the merchandise kickout 128. A period or space on the tape corresponding to 150 to 200 milliseconds between the new set of grouped frequencies, gives the 5,000 ohm 600 safety relay time to completely discharge its coil and open up contacts 602, and unlocking any 100 ohm selector coils in the selector banks, thereby insuring that if for any reason whatsoever a mixup has occurred in the previous cycle, a new cycle operation can begin and the rest of the order for the customer can be assured. In other words, only one item in the order would be missing and the reason could be immediately detected by checking the number of the item not delivered.

Naturally if the slave relay 153 for this item did not pull in, and solenoid 128 kickout did not deliver the merchandise, the cash register also did not get the pulse, and the customer would not be charged for this particular item. It is virtually impossible for the register to operate unless the merchandise has actually been kicked out since kickout unit and register are controlled by the same slave relay 153.

The relays used are the aircraft type K relays which have performed in tests for millions of operations and should insure this system with long, trouble-free service. All relays are mounted on plugs similar to the bases on radio tubes and therefore are easily removable for checking and replacement.

While the preferred construction of this system and the apparatus embodied therein has been described in some detail, it should be regarded by way of illustration and example rather than a restriction or limitation thereof, as many changes in the construction, combination and arrangement of the parts may be made without departing from the spirit and scope of the invention.

I claim:

1. An electronic marketing system comprising an article selecting station having a plurality of article selecting means, electronic pulsing means of different frequencies connected to said selecting means, a recording and reproducing device for receiving different pulses from the selecting means depending upon the articles selected, an article payment station having a receptacle for the recording and reproducing device, an article delivery means actuated by pulsing means of different frequencies, electrical connections from the article payment station receptacle to the article delivery means, the recording and reproducing device being bodily movable from the selecting station to the article payment station, and means for operating the recording and reproducing device at the selecting station to reproduce the pulses of frequencies corresponding to different articles in the reverse order from that in which the articles are selected and to record them in the different reversed frequencies at the article payment station to actuate the corresponding article delivery means in accordance with the pulses to which they respond.

2. An electronic marketing system, in accordance with claim 1, in which the selected pulses applied to the recording and reproducing device are recorded upon a movable tape which receives the pulses of different frequencies when the tape is moved in one direction at the selecting station and reproduces the pulses for different articles in a reverse order from that in which they are originally recorded by a reversal in direction of the tape by the operating means at the article payment station.

3. An electronic marketing system, in accordance with claim 2, in which a common delivery conveyor is provided for receiving articles in an order reverse to their original selection from the article delivery means and accumulating them at a common point.

4. An electronic marketing system, in accordance with claim 2, in which the pulsing means of different frequencies are connected to a pricing panel for recording signals representing prices of articles in the selecting station, and means in connection with the article payment station for receiving pulses from the recording and reproducing device to set up the prices of the article selected and to totalize the prices.

5. In an electronic marketing system, according to claim 1, a recording and reproducing device which has a recording tape movable in opposite directions, a driver within the device for moving the tape in opposite directions, and clutch means between the driver and the operating means at the selecting station and at the article payment station for operating the tape to reproduce a succession of pulses in one direction at one station and in the reverse order by operating the tape in the opposite direction at the other station.

6. In an electronic marketing system, according to claim 5, a central driver in the recording and reproducing device for moving the tape in opposite directions depending upon the direction of rotation of the driver, a motor at each station for operating the recording and reproducing device, and magnetic clutch means associated with each motor and the driver for selectively connecting the driver for the directions of rotation at the different stations.

7. In an electronic marketing system, according to claim 6, the receptacle having a recess at one side and the recording and reproducing device having a corresponding projection at one side so that the projection may be positioned in the recess to lock the recording and reproducing device in the receptacle.

8. In an electronic marketing system, in accordance with claim 7, in which the article selecting station has lights of different color and means for illuminating one of the lights when the recording and reproducing device is ready for operation, and means for illuminating one of the lights when the article selecting means and the recording and reproducing device are in operation.

References Cited in the file of this patent

UNITED STATES PATENTS

| | | |
|---|---|---|
| 2,247,905 | Bryce | July 1, 1941 |
| 2,335,277 | Heller | Nov. 30, 1943 |
| 2,587,686 | Berry | Mar. 4, 1952 |
| 2,588,915 | Erikson | Mar. 11, 1952 |
| 2,609,457 | Thurm | Sept. 2, 1952 |
| 2,661,682 | Saunders | Dec. 8, 1953 |
| 2,668,059 | Roberts | Feb. 2, 1954 |
| 2,702,315 | Roderick | Feb. 15, 1955 |
| 2,712,448 | Schroter | July 5, 1955 |
| 2,782,398 | West et al. | Feb. 19, 1957 |